March 16, 1948. D. SILBERMAN 2,437,793
ZIPPER MANUFACTURING MACHINERY
Filed Sept. 23, 1944 10 Sheets-Sheet 2
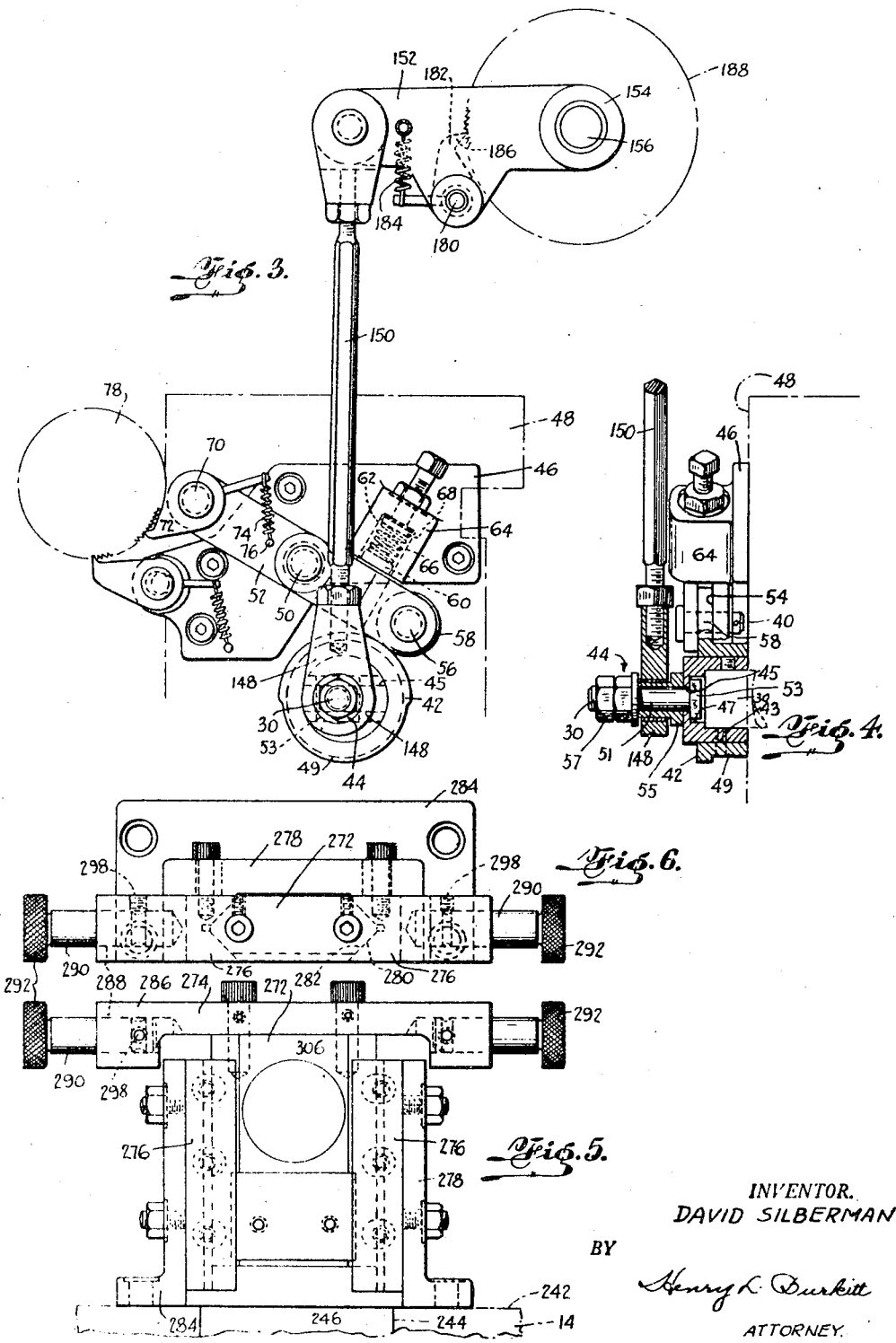
INVENTOR.
DAVID SILBERMAN.
BY
Henry L. Burkitt
ATTORNEY.

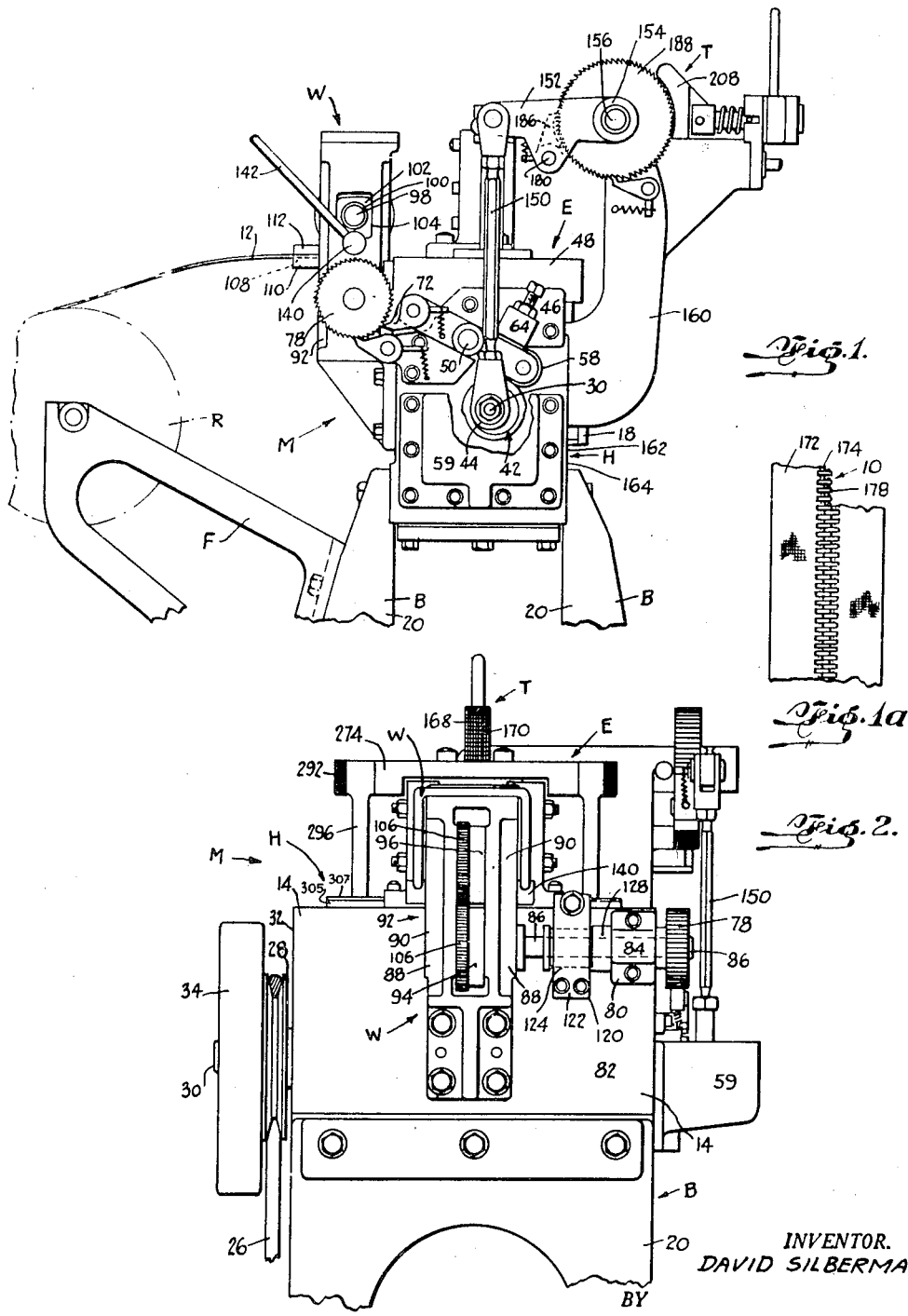

March 16, 1948.                    D. SILBERMAN                    2,437,793
                           ZIPPER MANUFACTURING MACHINERY
                     Filed Sept. 23, 1944         10 Sheets-Sheet 3
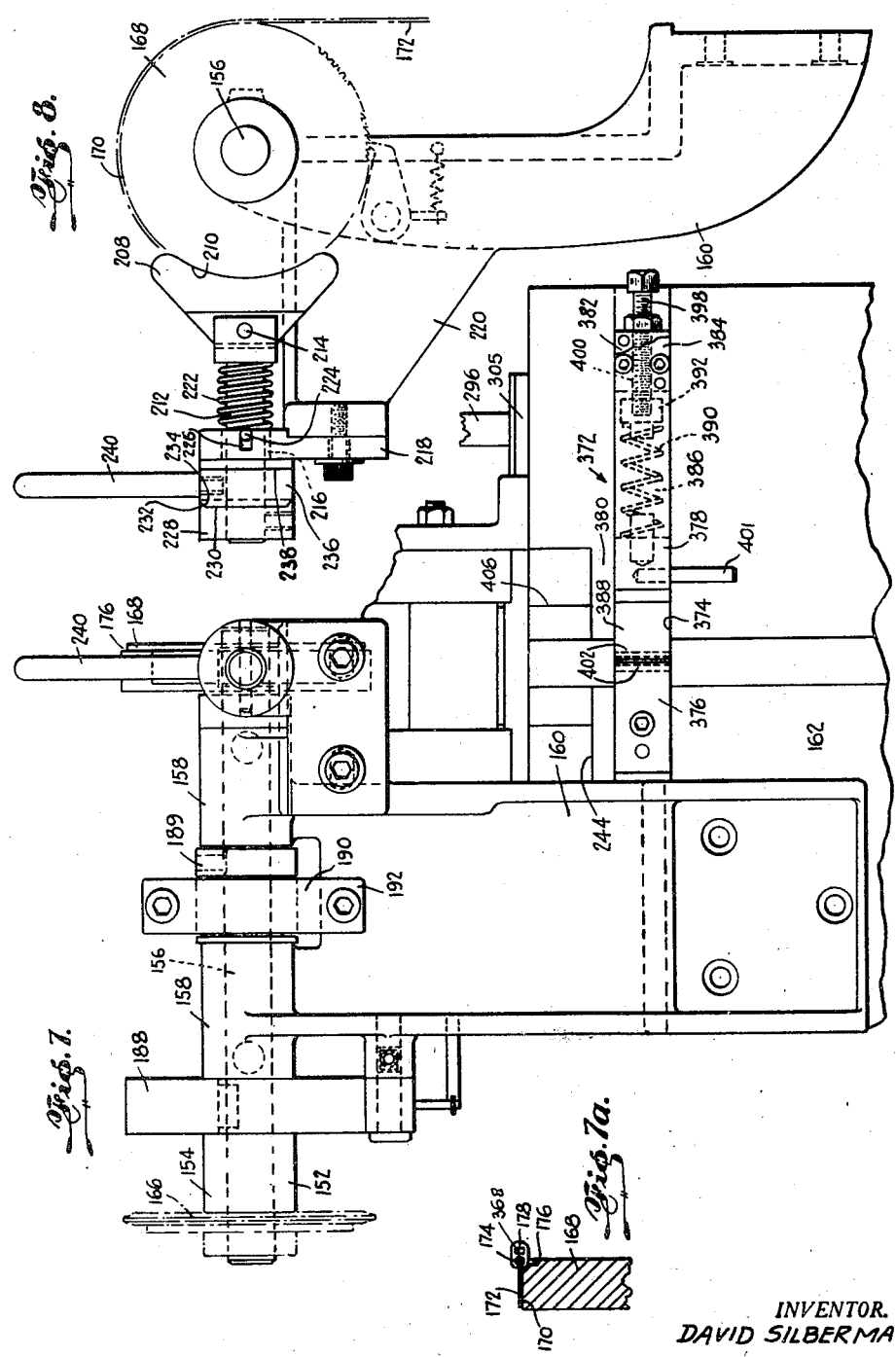
INVENTOR.
DAVID SILBERMAN
BY
Henry L. Burkitt
ATTORNEY.

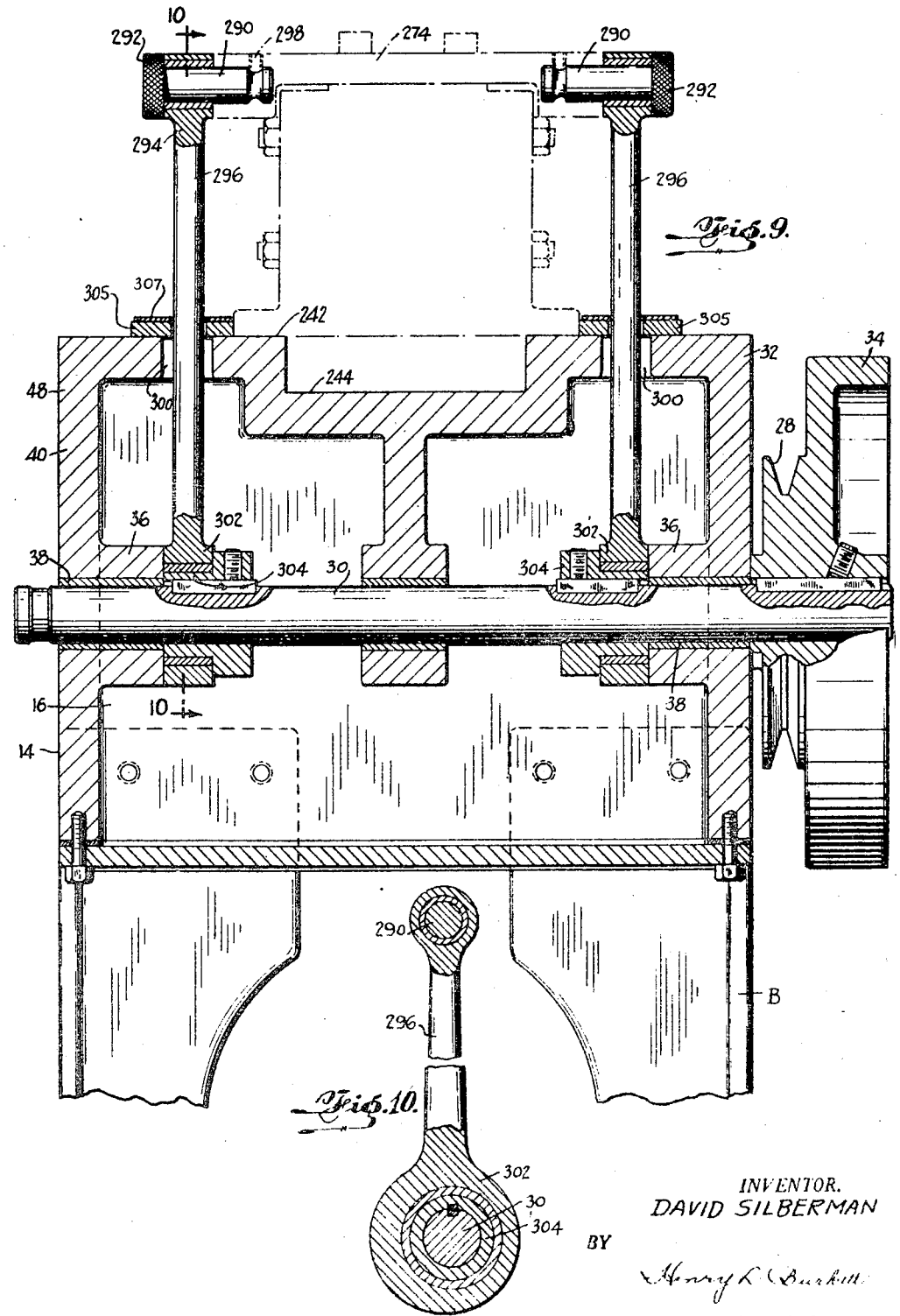

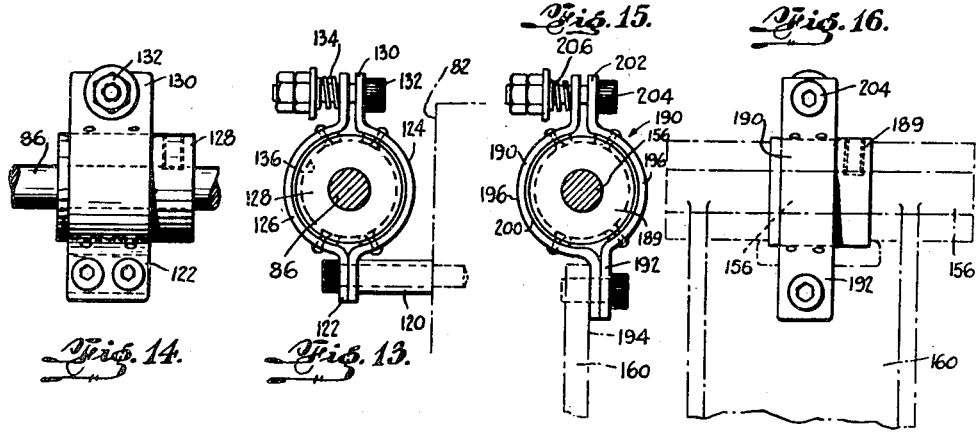
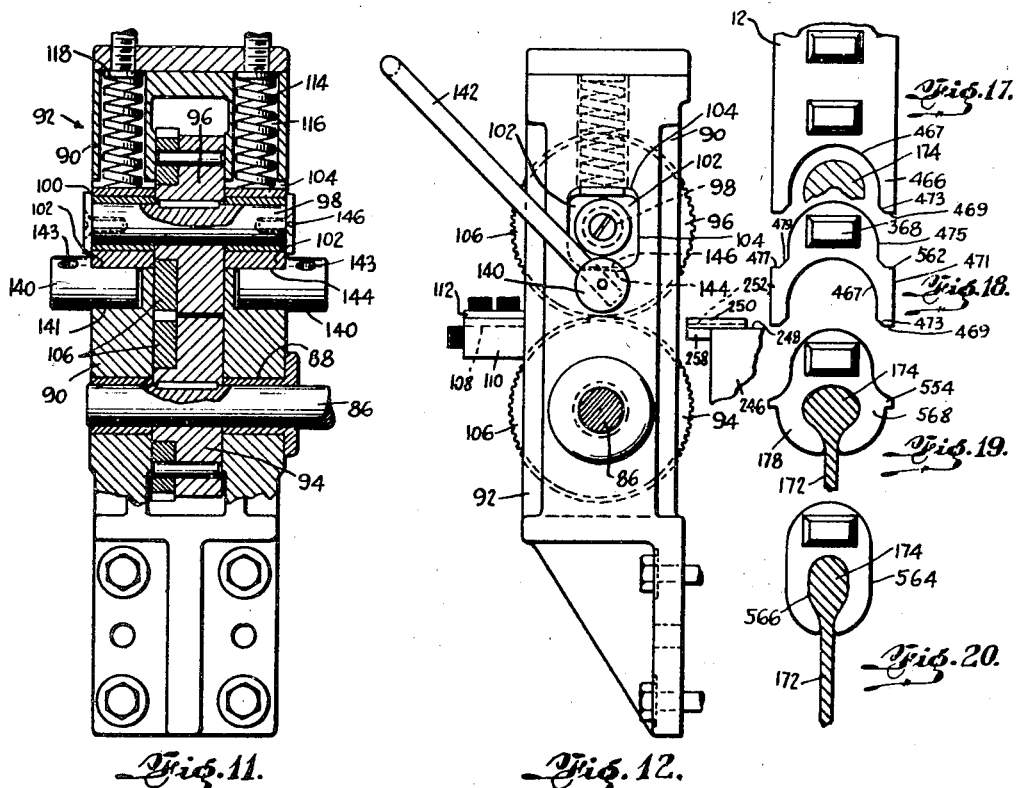
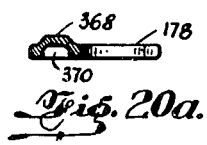
INVENTOR.
DAVID SILBERMAN.
BY
Henry L. Burkett
ATTORNEY.

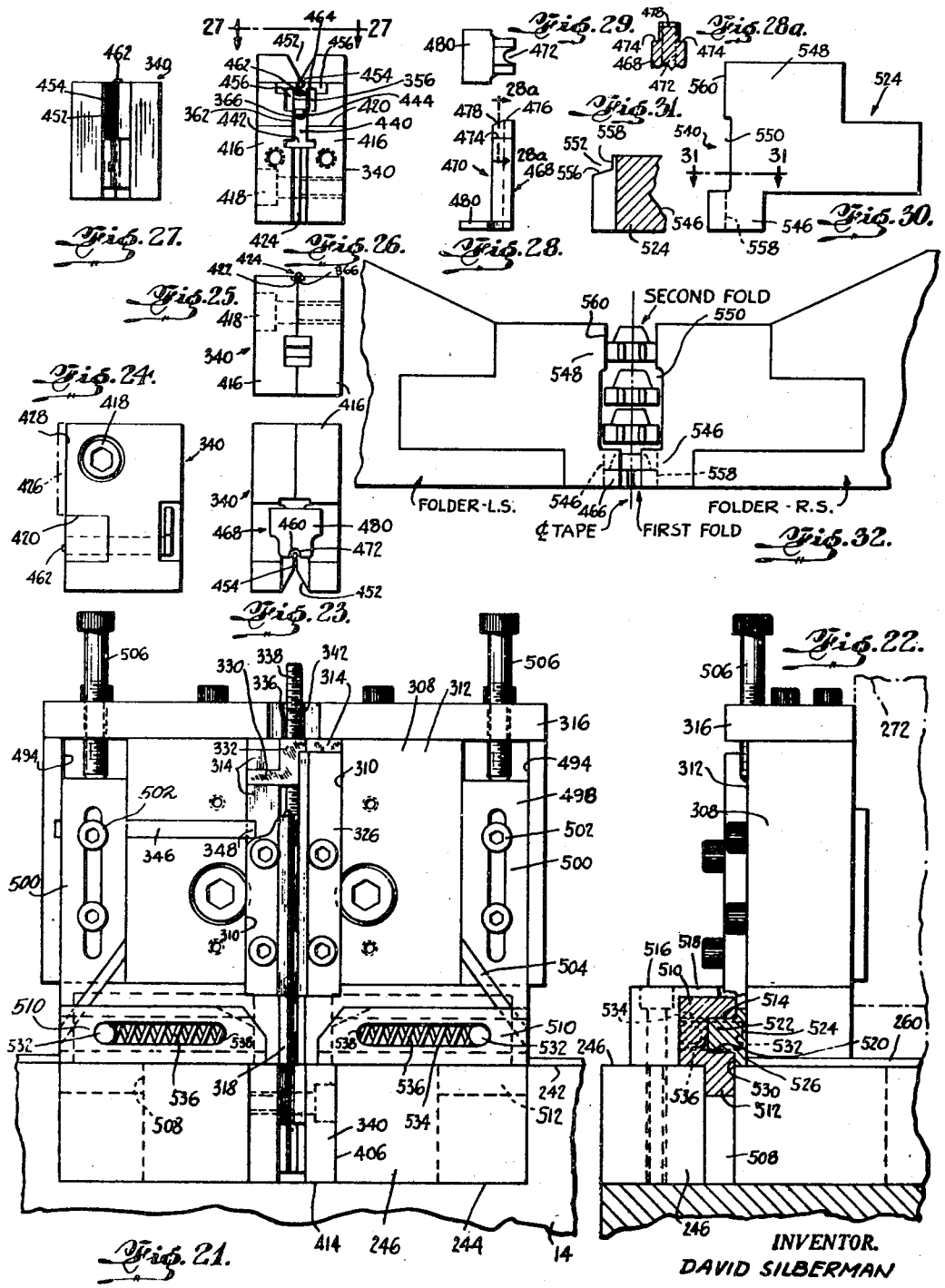

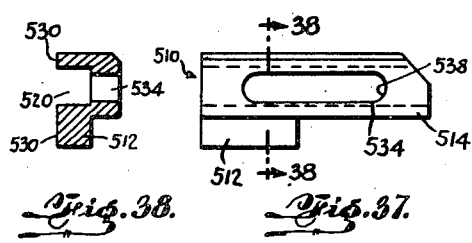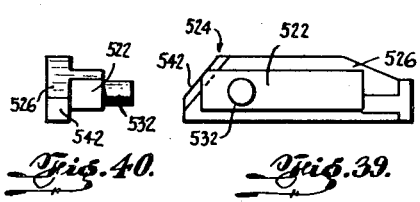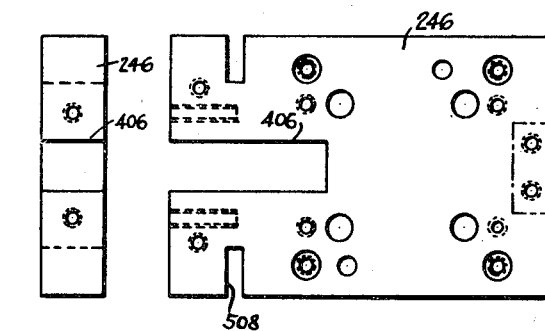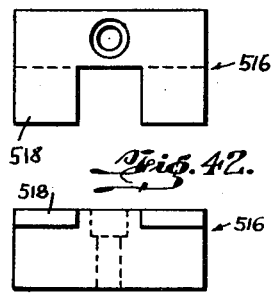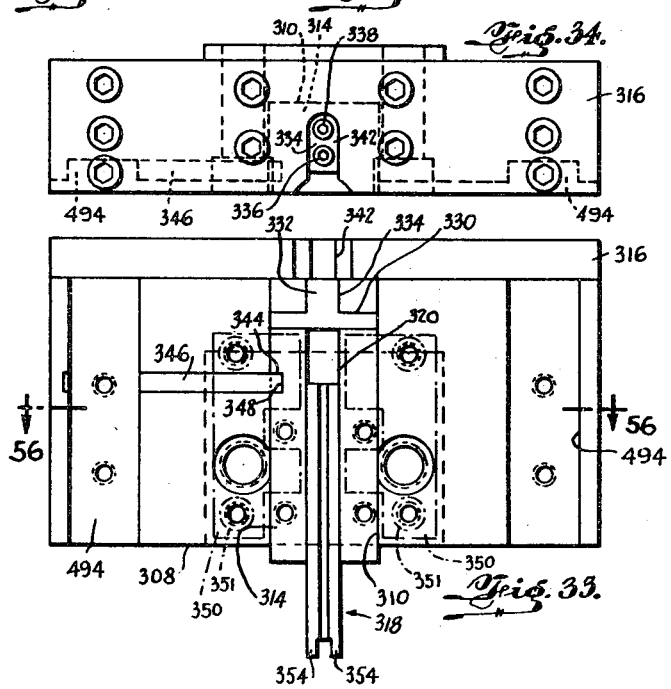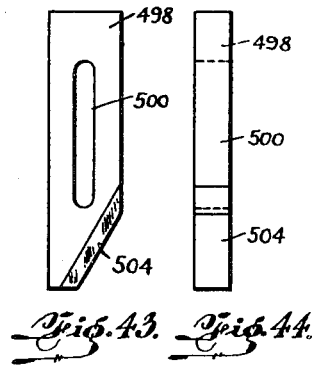

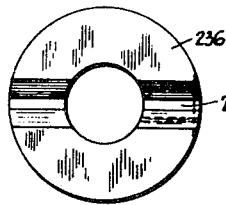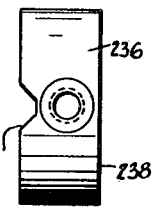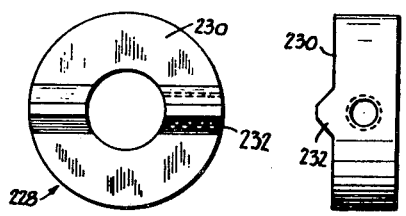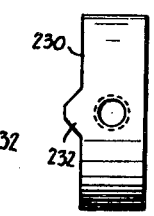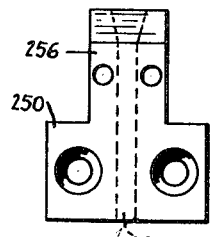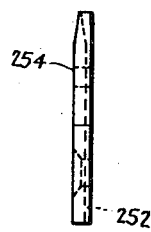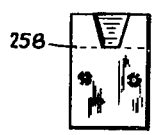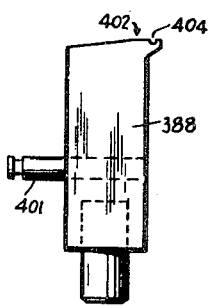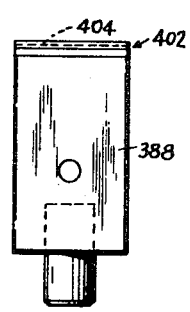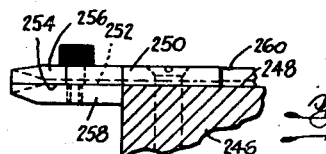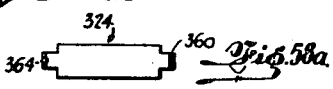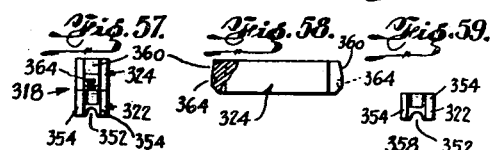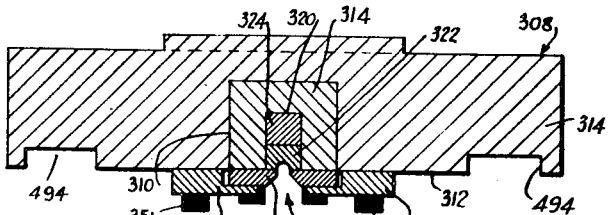

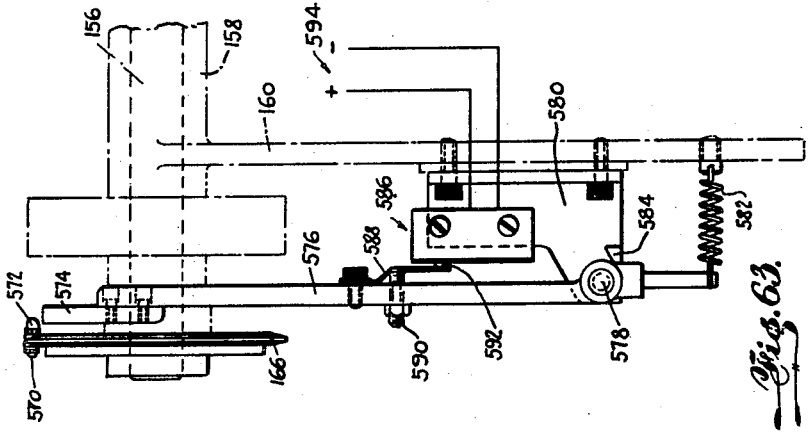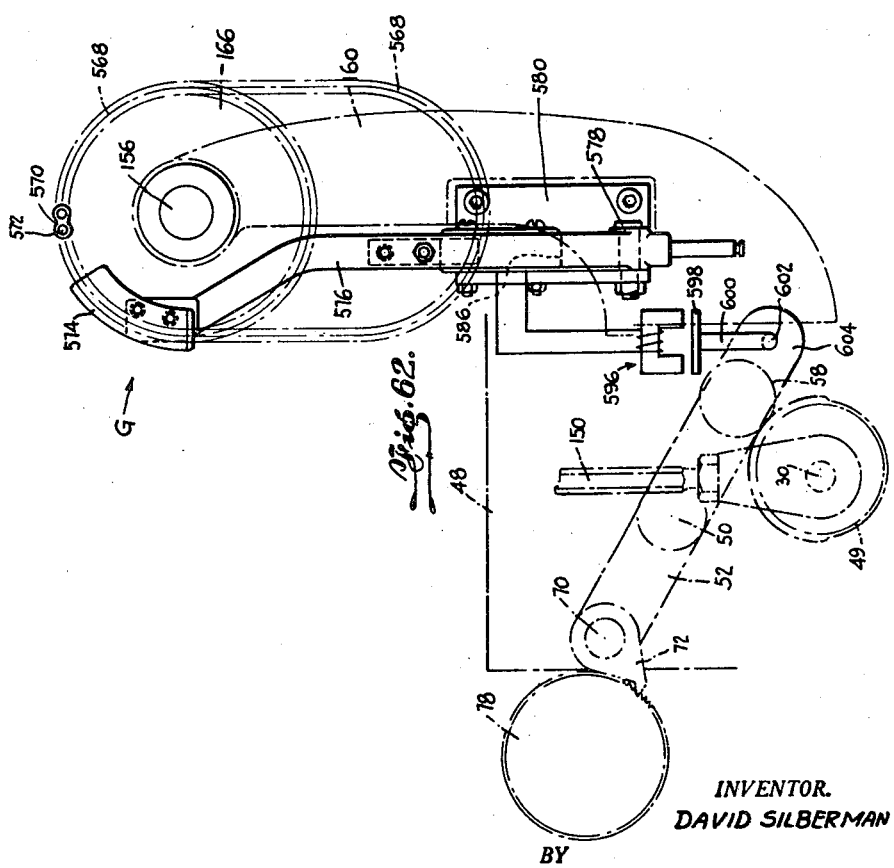

March 16, 1948.  D. SILBERMAN  2,437,793
ZIPPER MANUFACTURING MACHINERY
Filed Sept. 23, 1944    10 Sheets-Sheet 10
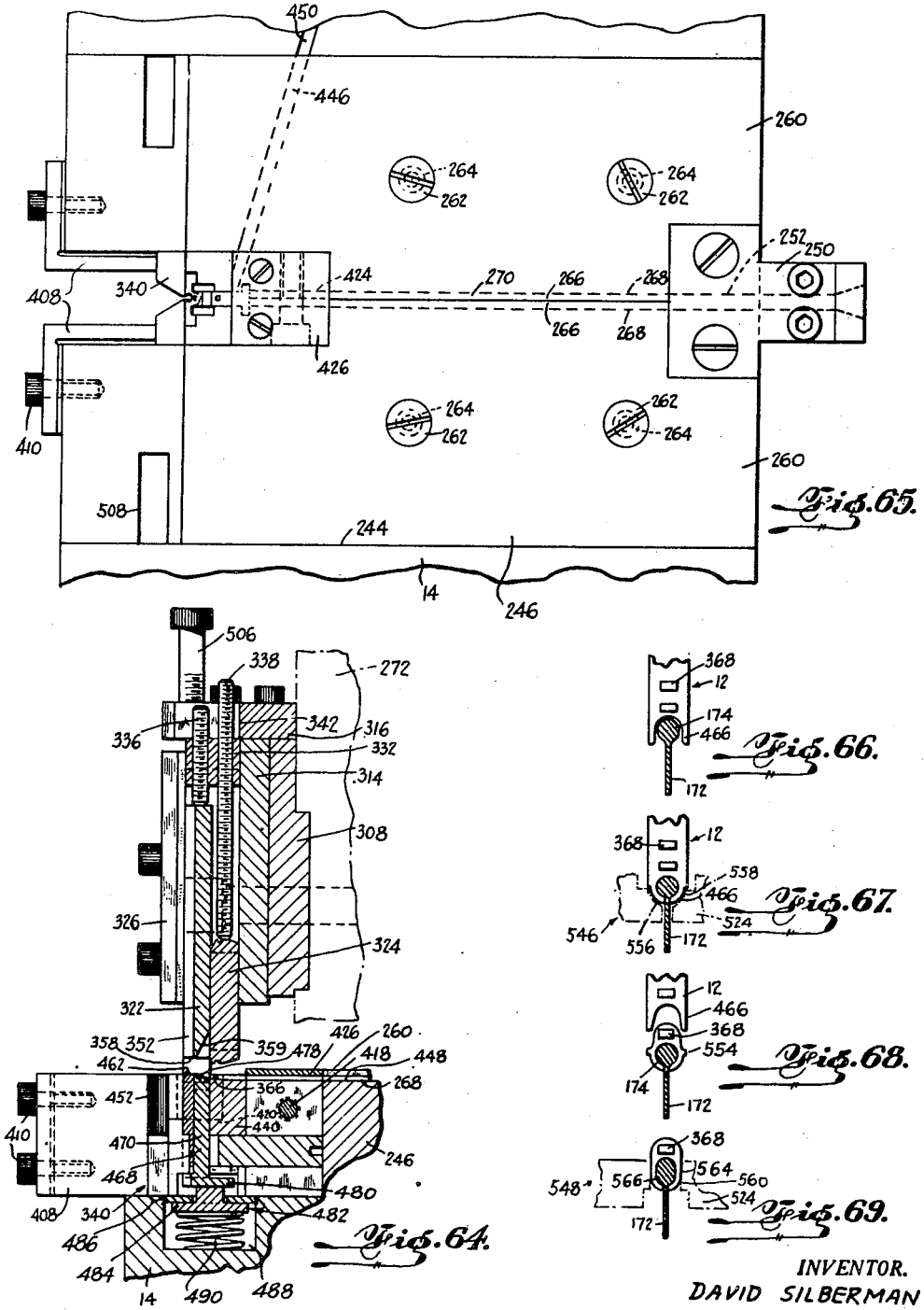
INVENTOR.
DAVID SILBERMAN
BY
Henry L. Burkitt
ATTORNEY.

Patented Mar. 16, 1948

2,437,793

UNITED STATES PATENT OFFICE 2,437,793

ZIPPER MANUFACTURING MACHINERY

David Silberman, New York, N. Y.

Application September 23, 1944, Serial No. 555,572

40 Claims. (Cl. 153—1)

1

This invention relates to zipper manufacturing machinery.

In the manufacture of zippers, one of the intermediate products generally is a stringer, a length of material which may take the form of a tape, upon an edge of which are disposed a plurality of members to which reference may sometimes be made herein as "zipper elements." In the manufacture of stringers, vital advances have been consummated by changes in the manufacturing process, where such changes result in large advantages in operation, and in the value of the product, both from the monetary and the mechanical standpoints.

One result sought under all circumstances is a stringer, the elements of which lock together firmly, and do not tend to separate on lateral stress. Also, it is desired that a formation be produced by the closed elements of the stringer to permit speedy and solid engagement by the slider, the member which cams the elements into and out of engagement with each other, and to permit use of a simple slider structure.

Another result that is sought is a simple machine, taking a strip of metal at one point, and a tape at another point, and delivering a completed stringer from some third point. It is desired that the simplicity of such a machine should be such that little or no supervision, and little or no repairs, be required for its operation. One great point in the cost of production of an article such as a zipper is the amount of time during which the machine is shut down for repairs, and is non-productive. Reduction of the amount of time during which it will be required to shut such a machine down for the replacement of worn out parts, aside from repairs from breakdowns, decreases the cost of the zipper produced by the machine.

It is an object of the invention so to simplify the operation of a zipper manufacturing machine that no particular mechanical skill will be requisite for repair or replacement of parts.

These machines have rapidly moving parts, introducing the factor of vibration, which, among other things, reduces the life of the machine. It is an object of the invention to construct a machine of this type so that vibration is reduced to a minimum.

The machine to be described takes a simple strip of metal, and forms and separates a zipper element from the strip, and attaches that element to a tape. The machine is designed to carry on this operation at such great speed that a continuous tape, with elements attached to its edge,

2 seems to feed from the machine. A single reciprocating part forms, cuts and attaches elements to the tape during each reciprocation. It is an object of the invention to locate the parts of the machine so that substantially all power delivering parts will be aligned in such manner with the main shaft that substantially little, if any, off-center power delivery will occur, and so that power delivery will be substantially vertically towards the base of the machine.

The resultant reduction in side sway during the operation of the machine limits vibration almost exclusively to that arising from the vertical impact of the punch upon the metal strip. Since substantially all the power-delivering parts of the machine, moving in the one direction at the time of impact, are thus balanced in great degree, the forces, which normally tend, during operation, to produce extreme vibration in a machine of this character, are eliminated.

In the production of zipper stringers, scrap is a problem of great importance. There is the monetary saving from elimination of metallic loss. Many of the so-called scrapless machines are incorrectly named; in substantially all cases, scrap of some kind is involved. It has been ascertained that, in cases where elements were specified, yet no method of production was ascertainable for producing the elements specified. One case deals with the production of zipper elements by actual incision through the metal, and dividing the metal by a mechanical spreader. Such method, for wire of very small dimensions, is impractical. A spreader punch for such purposes would destroy, rather than make an incision in, the metal.

It is an object of the invention to manufacture zipper stringers by making a zipper element and attaching it to a tape as a part of a continuous operation, while a strip of metal is formed into the elements, and the elements are attached to the tape as a part of a continuous operation, where no scrap of any kind is produced, where all metal from the metallic strip is utilized in the production of the element, and where no incision is produced in the strip for the production of such elements.

The scrap produced by so-called scrapless machines has an important bearing upon efficient operation. The product is a very fine, jewel-like element. Therefore, the scrap produced in making such elements is of a very minute character. Such scrap tends positively to adhere to the moving parts of the machine, no matter how the designer intends to discharge it from the apparatus. These moving parts, which produce the element, are small. Because of their small dimensions, they are susceptible to injury from unpredictable impacts derived from such minute pieces of scrap. Since the parts move at great speed, the elimination of such scrap must be solved; otherwise, the machine is subject to various periods of shutdown while parts broken or injured because of such scrap are being replaced or repaired.

It is an object of the invention to eliminate scrap entirely from the production of zipper elements and their attachment to tape for the production of zipper stringers.

It is an object of the invention to provide a press wherein the apparatus need not be knocked down for repair or replacement of punch or die parts.

Other objects of this invention will be set forth hereinafter, or will be apparent from the description and the drawings, in which are illustrated embodiments of apparatus, process and product exemplifying the invention.

The invention, however, is not intended to be restricted to any particular construction or product, or any particular arrangement of parts, or any particular application of such construction or arrangement of parts, or any specific method of operation, or any of various details thereof, even where specifically shown and described herein, as the same may be modified in various particulars, or may be applied in many varied relations, without departing from the spirit and scope of the claimed invention, practical constructions embodying certain details of the invention being illustrated and described, but only for the purpose of complying with the requirements of the statutes for the disclosure of operative embodiments, but without attempting to disclose all of the various forms and modifications in which the invention might be embodied.

On the drawings, in which the same reference characters refer to the same parts throughout, and in which are disclosed such practical constructions, Fig. 1 is a side elevational view of apparatus embodying features of the invention, the base, the frame and the reel of wire being broken away, and a part of an oil container being broken away to disclose other parts of the mechanism;

Fig. 1a is a plan view of a portion of a stringer produced by apparatus such as shown in Fig. 1;

Fig. 2 is an elevational view of the apparatus shown in Fig. 1, seen as looking at the apparatus from the right hand side in Fig. 1, the frame, the reel of wire, the wire itself and the part of the base being detached or removed, and the belt being broken away in section;

Fig. 3 is a detail elevational view, to enlarged scale, of parts of the wire feeding and tape feeding mechanisms, as seen in Fig. 1;

Fig. 4 is a side elevational view of a detail of the apparatus shown in Fig. 3, the connecting rod being broken away in section, and other parts of the apparatus not being shown, and the assembly of the cam and eccentric being broken away in section for clarity;

Fig. 5 is a detail front elevational view of the assembly of the ram, ram housing and crosshead with the base;

Fig. 6 is a plan view of the apparatus shown in Fig. 5, the base not being shown;

Fig. 7 is an elevational view, to enlarged scale, of the tape feeding and tensioning mechanisms as seen from the right hand side of Fig. 1, the ram housing and other details of the apparatus being broken away;

Fig. 7a is a view, to enlarged scale, of a portion of the tape feeding wheel, showing the manner of cooperation of the stringer with the wheel;

Fig. 8 is a side elevational view of a detail of the apparatus shown in Fig. 7, illustrating the bracket carrying the tape feeding means and the associated parts cooperating with the tape feeding wheel, the stringer being shown by dot-and-dash lines;

Fig. 9 is a vertical sectional view, to enlarged scale, taken substantially lengthwise of the main housing, parts of the base being broken away, and parts of the apparatus being removed, the ram housing and associated parts being shown in dot-and-dash lines, the flywheel and the pulley being broken away in section in part, and part of the main shaft and the connecting rods being broken away in section;

Fig. 10 is an elevational view of the connecting rod as assembled with its shaft and pin, as shown in Fig. 9, parts being broken away in section;

Fig. 11 is an elevational view, to enlarged scale, of the wire feeding assembly shown in Fig. 2, parts of the apparatus being broken away in section;

Fig. 12 is an end elevational view of the apparatus shown in Fig. 11, illustrating the association of wire guiding devices therewith and in relation to the base;

Fig. 13 is a detail view, in elevation, of a part of the braking mechanism for the wire feeding means, the shaft being shown in section, and the base being shown by dot-and-dash lines;

Fig. 14 is a front elevational view of the apparatus shown in Fig. 13;

Fig. 15 is a view, similar to Fig. 13, of the braking mechanism associated with the tape feeding mechanism;

Fig. 16 is a front elevational view of the apparatus shown in Fig. 15;

Fig. 17 is a plan view of a strip as it appears as its end is worked and cut by the element forming means, the strip being broken away, and a part of the tape being shown;

Fig. 18 is a plan view of an element which would be produced by such apparatus as here illustrated if the apparatus were operated without attaching the element directly to the tape;

Fig. 19 is a plan view of an element shown attached to a tape at an intermediate stage of the process of attaching the element to the tape, the tape being shown in section;

Fig. 20 is a plan view of an element attached to the tape after the final stage of attaching elements in accordance with the process, the tape being shown in section;

Fig. 20a is a vertical cross-sectional view of an element such as shown in Fig. 20, the tape not being shown;

Fig. 21 is a front elevational view of the base die block, clamp blades and punch block assembly, the clamps for the die piece retaining block for the clamp blade housings, and for the punch piece retaining member not being shown, and the means for fastening the punch block to the ram not being shown;

Fig. 22 is an end elevational view of the apparatus shown in Fig. 21, the base being broken away to show the die block, and the clamp blade housing, and the clamp blade being shown in section, the ram being shown by dot-and-dash lines;

Fig. 23 is a bottom plan view of a die block and associated parts embodying features of the invention;

Fig. 24 is a side elevational view of the block shown in Fig. 23, the stripper plate for the block being shown by dot-and-dash lines;

Fig. 25 is an end elevational view of the die block shown in Fig. 23;

Fig. 26 is a top plan view of the assembly of die block and strip returning member of Fig. 23;

Fig. 27 is a view of the die block as seen from the end indicated by line 27—27 of Fig. 26;

Fig. 28 is an elevational view of the strip returning member;

Fig. 28a is a detail vertical cross-sectional view of a portion of the strip returning member, as seen from the line 28a—28a of Fig. 28;

Fig. 29 is a plan view of the member shown in Fig. 28;

Fig. 30 is an elevational view of the clamp blade or folder for closing the elements upon the tape;

Fig. 31 is a detail cross-sectional view of the clamp blade, as seen from the line 31—31 of Fig. 30;

Fig. 32 is an end elevational view, to enlarged scale and broken away, showing the operation of the folder or clamp members;

Fig. 33 is an elevational view of the punch block, showing the removable punch retaining member and the punch assembled therewith, the clamps for the punch retaining member being shown by dot-and-dash lines;

Fig. 34 is a plan view of the punch block shown in Fig. 33, the punch retaining member being shown in position;

Fig. 35 is a plan view of the die block, the position of one of the wire guides being shown by dot-and-dash lines;

Fig. 36 is an end elevational view of the block shown in Fig. 35, as seen from the left hand end of Fig. 35;

Fig. 37 is an elevational view of a clamp blade housing;

Fig. 38 is a transverse cross-sectional view, on the line 38—38 of Fig. 37;

Fig. 39 is an elevational view of a clamp blade or folder member for cooperation with the housing shown in Fig. 37;

Fig. 40 is an end elevational view of the clamp blade shown in Fig. 39, as seen from the left hand end of Fig. 39;

Fig. 41 is an elevational view of a lock for the clamp blade housing;

Fig. 42 is a plan view of the lock shown in Fig. 41;

Fig. 43 is an elevational view of a cam member for assembly with the punch block for operating the clamp blade or folder;

Fig. 44 is an end elevational view of the cam member shown in Fig. 43;

Fig. 45 is a plan view of a cam member for release of the tape feeding mechanism;

Fig. 46 is an end elevational view of the member shown in Fig. 45;

Fig. 47 is a plan view of the member for cooperation with the cam member shown in Fig. 45;

Fig. 48 is an end elevational view of the member shown in Fig. 47;

Fig. 49 is a plan view of a part of the wire guiding means;

Fig. 50 is an end elevational view of the part shown in Fig. 49;

Fig. 51 is a plan view of a part cooperating with the part shown in Fig. 49;

Fig. 52 is an end elevational view of the part shown in Fig. 51;

Fig. 53 is a detail assembly view, showing the association with the base of the apparatus of the parts of Figs. 49 to 52;

Fig. 54 is a plan view of a detail of the tape tensioning mechanism;

Fig. 55 is a side elevational view of the device shown in Fig. 54;

Fig. 56 is a view in transverse cross-section, on the line 56—56, of the assembly of punch block, punch retaining member and punch, shown in Fig. 33;

Fig. 57 is a bottom plan view of the two sections of the punch, as assembled;

Fig. 58 is an elevational view of one of the sections of the punch shown in Fig. 57, one end of the section being broken away in cross-section;

Fig. 58a is a plan view of the punch section shown in Fig. 58;

Fig. 59 is an end elevational view of one of the sections of the punch shown in Fig. 57;

Fig. 60 is an elevational view of the punch section shown in Fig. 59;

Fig. 61 is a side elevational view of the punch section shown in Fig. 60, part of the punch being broken away in cross-section;

Fig. 62 is a detail view of modified construction for the tape and wire feeding means, associated parts of the apparatus being shown by dot-and-dash lines, and the parts of the apparatus for producing a gap in the stringer being illustrated by full lines;

Fig. 63 is an end elevational view of the apparatus shown in Fig. 62;

Fig. 64 is a detail vertical cross-sectional view, illustrating the association of the punch block, the punch retaining member, and the punch, with the base, the die block, the die piece retaining member, and the different portions of the die, together with the ram;

Fig. 65 is a plan view of a portion of the base, showing the relationship of the die block, the die piece retaining member, the clamps therefor, the stripper plates and the associated elements of the apparatus; and Figs. 66, 67, 68 and 69 are detail views, illustrating the feeding and forming of the strip in relation to the tape edge, the tape being shown in cross-section.

Machine M (Figs. 1 and 2), illustrated upon the drawings, for the manufacture of stringers 10 (Fig. 1a), may include a mounting such as base B upon which a housing H may be mounted. Extending from base B may be a frame F for supporting a reel R of wire 12 which is guided to the apparatus in the manner to be described, for the production of the stringers.

In conjunction with housing H may be located substantially all mechanism necessary for the production of zipper stringers 10 from wire 12. Such mechanism may include wire feeding means W, tape feeding means T, and element forming and attaching means E. Housing H may take the form of a hollow casting 14, which may be retained upon base B in any suitable manner. The cavity 16 (Fig. 9) of casting 14 may provide a container for lubricating oil. For this purpose, a sight glass 18 (Fig. 1) may be connected with cavity 16 to indicate the level of oil retained therein.

In the instance shown, base B may include a plurality of legs 20. A platform (not shown) may be carried between legs 20 to support a motor (not shown), fixed to the platform by any suitable means. Power is delivered by the motor through a belt 26 to a pulley 28 upon a main shaft 30 which extends through side wall 32 of casting 14 at that position. A flywheel 34 may be formed together with pulley 28.

Bearing members 36 for shaft 30 may be positioned at a pair of aligned openings 38 in side walls 32 and 40. Shaft 30 extends beyond the outer face of wall 40, where a cam 42 and an adjustable eccentric 44 are mounted. Cam 42 (Figs. 3 and 4) includes a collar 43 secured to the end of shaft 30 extending beyond wall 40. Collar 43 is formed with a slot 45 opening from an undercut transverse squared recess 47. On collar 43 is carried a cam ring 49 which is fixed to collar 43 against rotation by any suitable means. A pin 51 extends through and is slidable in slot 45 and has a squared head 53 received in recess 47. A collar 55 carried upon pin 51 serves as a bearing for adjustable eccentric 44. Suitable lock nuts 57 may be used to lock pin 51 and collar 55 in any adjusted position with relation to slot 45 and recess 47, to vary the eccentricity of eccentric 44. A guard cup 59 may be secured to face 48 of wall 40 to guard these parts.

By means of a plate 46, affixed to face 48, a pin 50 is positioned to function as a bearing for an arm 52. A cut-out 54 is formed in arm 52, and a pin 56 is extended across the opening of cut-out 54 and is fixed in the walls thus formed by the cut-out. A roller 58 is provided its bearing upon pin 56 so that it is in position to bear upon cam ring 49. A follower 60 is mounted to slide in a bore 62 under the action of a spring 66. The bore is formed in a boss 64, formed as a part of plate 46. The spring is retained between the end of the bore and follower 60, and causes arm 52 to retain roller 58 in engagement with ring 49. The pressure of spring 66 may be varied by means of a follower 68 which includes a screw-threaded adjustment at one end of bore 62 for that purpose.

One end of arm 52 is reduced in section, and retains a pin 70 which provides a bearing for the forked end of a finger 72. A spring 74, anchored at one end to an extension 76 from arm 52, engages finger 72 and maintains the finger in engagement with a ratchet wheel 78 for wire feeding means W. Carried in a bracket 80 upon wall 82 of casting 14 is a bearing 84 for a shaft 86 to which ratchet wheel 78 is affixed. Shaft 86 extends parallel to wall 82, and through a pair of bearings 88 (Figs. 2, 11 and 12) carried in the walls 90 of a housing 92. A knurled wheel 94, fixed to rotate with shaft 86, is retained between walls 90.

Above wheel 94, and retained between walls 90, is positioned another knurled wheel 96 affixed to a shaft 98. Shaft 98 is provided bearings 100 in a pair of square members 102 which are free to slide within a pair of openings 104. Openings 104 are formed in walls 90 above bearings 88. A pair of gears 106 are secured, or formed integrally with wheels 94 and 96. These gears mesh at substantially all times to drive both wheels simultaneously from shaft 86.

Wire 12 is inserted between wheels 94 and 96. First however, it must pass through a guide provided by a groove 108. Groove 108 is formed in the top face of a guide piece 110 affixed to housing 92 in advance of the position of knurled wheels 94 and 96. Groove 108 is aligned with the topmost level of wheel 94, and serves to guide wire 12 into proper relation to forming and attaching means E. A plate 112, affixed to the top face of guide piece 110, closes groove 108 and retains wire 12 within the groove during the feeding action.

Springs 114, retained in recesses 116 formed in walls 90, bear against the top faces of members 102. The extent of openings 104 permits movement of members 102 so that knurled wheels 94 and 96 will be spaced apart sufficiently, positively to engage wire 12 of the thickness necessary for proper operation of the apparatus. At the same time, movement of members 102 will not interfere with proper engagement of gears 106 for driving the knurled wheels. Proper compressor members 118 are threadedly adjustable relatively to recesses 116 for varrying the pressure upon members 102.

A bracket 120 (Figs. 2, 13 and 14) may be provided on wall 82. Secured upon bracket 120 are ends 122 of a pair of straps 124 which have arcuate sections 126 positioned to encircle a collar 128 fixed to shaft 86. Straps 124 are so formed that at least one set of ends 122, even when secured to bracket 120, or opposed ends 130 will be spaced apart. A bolt 132 passed through ends 130 retains a spring 134 for providing the necessary resiliency as the straps press a braking piece 136 of leather or other suitable material into engagement with the outside face of collar 128. Thus, the action of the step-by-step motion rotating shaft 86 is restrained to movement substantially in one direction.

A pair of pins 140 are fitted into openings 141 in walls 90, and may be rotated by means of a handle 142. For this purpose, openings 143 are formed in pins 140; the ends of handle 142, a U-shaped member, are fitted into the openings, and then are secured in position by means such as set-screws. The pins have flat faces 144 to engage against bottom faces 146 of members 102. Upon movement of handle 142 to lowered position, members 102 are cammed upwardly, and, with them, shaft 98, and its associated knurled wheel 96 and gear. Thus, the feeding mechanism, embodied in the knurled wheels, may be forced apart for threading wire into the machine, or are forced positively into engagement with the wire to be fed by the machine.

Collar 55 of eccentric 44 on shaft 30 (Figs. 1 to 4) carries an eccentric strap 148, which, through a rod 150, transmits motion to an arm 152. Arm 152 has a hub 154 through which a shaft 156 extends loosely. Shaft 156 is carried in bearings 158 (Figs. 7 and 8) formed in a bracket 160 which is secured to face 162 of wall 164. A sprocket 166 may be secured at one end of shaft 156 beyond hub 154. Sprocket 166 may serve as a spacing collar for retaining the shaft in proper relation to bearings 158, and also for other purposes hereinafter to be described.

A tape feed wheel 168 may be secured at the other end of shaft 156, and, with sprocket 166, serves to retain the shaft against lateral movement. Wheel 168 may have a knurled face 170 (Fig. 2) upon which a tape 172 (Figs. 7a and 8) having a beaded edge 174 is positioned for feeding. The wheel is cut away at one edge of the knurled face to provide a groove or recess 176 in which portions of elements 178, affixed to bead 174, may be received.

Arm 152 has a pin 180 (Figs. 1 and 3) fixed thereto. Upon pin 180 a finger 182 is provided a pivotal bearing. A spring 184 engaged between finger 182 and arm 152 serves to maintain ratchet tooth 186 of finger 182 in engagement with the ratchet wheel 188, mounted on shaft 156 between hub 154 and one of bearings 158.

At a position between bearings 158, bracket 160 may be cut away (Figs. 7, 15 and 16). At that point, shaft 156 may have a collar 189 fixed to rotate therewith. A pair of straps 190 have their ends 192 fixed against a face 194 of bracket 160 so that arcuate portions 196 of the straps substantially encircle collar 189. A strip 200 of leather or similar frictional material may be retained by portions 196, in engagement with the face of collar 189 to apply braking action to shaft 156. Straps 190 may terminate in a pair of arms 202 through which a bolt 204 may be passed. A spring 206 retained between one arm 202 and suitable lock-nuts on bolt 204 produces adjustment and resiliency for the braking device. This braking device prevents reverse rotation of shaft 156 as tooth 186 moves reversely over wheel 188 after having rotated wheel 188 in the feeding direction.

In order to assure that the tape be fed positively, a brake shoe 208 (Figs. 1, 7 and 8) is resiliently pressed towards engagement with knurled face 170. Shoe 208 has a face 210 shaped to conform to the arcuate shaping of wheel 168; but face 210 is smooth. A rod 212, loosely pinned at 214 to shoe 208, is slidable through an opening 216 in a bracket arm 218. Arm 218 is secured to a bracket arm 220 extending upwardly from bracket 160. A spring 222 on rod 212 between arm 218 and shoe 208 causes the shoe to apply the desired pressure against the tape caught between faces 170 and 210.

A pin 224, fixed in rod 212 and engaged in a slot 226 in arm 218, prevents rotation of rod 212. A collar 228 (Figs. 8 and 45 to 48), affixed to the extending part of rod 212 beyond arm 218, has a face 230 including a cam projection 232. Projection 232 is formed to interlock with a recess 234 in a collar 236. Collar 236 is loose upon rod 212, and has a flat face 238 for abutment against arm 218, where it is held by the action of spring 222. A handle 240, secured to collar 236, provides means for rotating the collar upon rod 212, to move cam projection 232 to move out of recess 234. Thus rod 212 is moved against the action of spring 222 to release brake shoe 208 from engagement with wheel 168 whenever it is desired to adjust the tape upon the wheel, or to position a new length of tape.

Forming and attaching means E is constructed to permit easy and ready separation of an entire assembly, or for the separation of one or more units, so that repairs and replacements may be made easily without disturbing the rest of the apparatus. Top wall 242 (Figs. 7, 9, 21, 22, 35 and 36) of casting 14 is formed with a recess 244 for receiving a block 246. At the side of housing 92 adjacent block 246 (Figs. 12 and 53), wire 12 is fed towards the punch and die by wheels 94 and 96 immediately at the top face 248 of block 246. At this position, a plate 250 is secured to face 248, and has a groove 252 formed in its bottom face 254. Plate 250 extends towards wheels 94 and 96 away from block 246. Beneath extension 256 thus formed, a small plate 258 is secured in position to complete the groove 252. Grooves 108 and 252 are in alignment, and together serve to retain the wire properly for feeding.

Beyond plate 250, a pair of stripper plates 260 are secured in position on top face 248, and are capable of limited adjustment. Plates 260 are secured to block 246 by cap screws 262 inserted through plates 260 at openings 264 which are slightly larger than screws 262. In this manner, limited adjustment of the plate edges 266 relatively to each other is made possible. Each edge 266 has a step 268; these steps are juxtaposed when the plates are assembled, and form a groove 270, in alignment with grooves 108 and 252, for receiving the wire as it is fed by the wire feeding means up to the position of the punch and die.

Reciprocating vertically with relation to block 246 is a ram 272 (Fig. 22) carried by a crosshead 274 (Figs. 5, 6 and 9). Ram 272 is slidable in ways 276 which are secured in a housing 278. Ways 276 are in the form of separate gibs which, by suitable securing means, are anchored in position in opposed corners of housing 278. Ways 276 have V-shaped grooves 280 to receive the V-shaped sides 282 of ram 272. Housing 278 is of a width to extend across recess 244 so that its footing 284 may be secured, by suitable means, to the top wall 242 of casting 14.

Ram 272 is secured to crosshead 274 by suitable securing means. The ends of crosshead 274 are formed with enlarged sections 286 having recesses 288 into which bearing pins 290 are received. Pins 290 are formed with heads 292, and are, in turn, received through the straps 294 (Fig. 9) at the ends of connecting rods 296. Set screws 298 lock pins 290 in place and thus hold straps 294 in proper relation to rock upon the pins in reciprocating the ram. Connecting rods 296 extend down into casting 14 through openings 300 in top wall 242 to eccentric straps 302 (Figs. 9 and 10), forming part of the connecting rods, which are received upon eccentrics 304 on shaft 30. Cover plates 305 may be provided at openings 300 to guard against foreign matter entering the chamber. A suitable flexible washer 307 may be fitted around each rod 296 to accommodate itself to the slight movement of the rod in sealing opening 300.

As shown, there is a rod 296 at each end of crosshead 274. Balanced forces are thus delivered to crosshead 274. Furthermore, the eccentricities of eccentrics 44 and 304 are small, being sufficient to obtain the small stroke necessary for the operation of the respective parts. Since wire or strip of relatively small thickness is utilized in these operations, only a small effective stroke of the ram is necessary. Thus, it has been made possible to perform these operations without massive cranks, of great stroke, but by small eccentrics of very small stroke. Furthermore, the centers of pins 290 are substantially perpendicularly above the center line of shaft 30. In the same manner, eccentric 44, and rod 150 actuated by that eccentric are disposed substantially perpendicularly vertically from shaft 30. Thus, substantially no off-center thrust results during the operation of the machine. Substantially all forces delivered are in substantially a single plane, torque is minimized, and vibration reduced to a minimum. Ram 272 and rod 150 move up and down substantially simultaneously and almost to the same degree, and vibrate substantially in that single plane, which also is the plane for the center-line of flywheel 34 the tendency of which is to absorb any of the vibration produced by any very slight lateral vibration.

The main body 306 of ram 272 takes the shape of a block having V-shaped edges 282 (Figs. 5 and 6). To body 306 is secured a ram block 308 (Figs. 22 and 23). A recess 310 (Figs. 21, 33, 34 and 56) is provided centrally of the front face 312 of block 308 to receive a punch block 314 snugly held in position by suitable means to be described. Secured on top of block 308 is a plate 316. Block 314 will be moved solidly up against the bottom face of plate 316 during the operation of the apparatus.

The manner in which punch block 314 is assembled with ram block 308, and the method of assembly and adjustment of punch 318 with relation to block 314, constitute means applicable to machinery such as here described for zipper manufacture as well as for general application for punch press operation. By the arrangement to be described, it is possible to change punches and dies without first taking apart substantially the entire apparatus.

Block 314 is formed with a recess 320. In this recess, punch 318 is snugly seated. In the instance illustrated, punch 318 (Figs. 56 to 61) is made up of two distinct sections 322 and 324. Section 324 is positioned at the bottom of recess 320, with section 322 abutting against it. Then a pair of clamp plates 326, anchored against face 312 of block 314, hold both sections against separation from block 314. Block 314 (Figs. 21, 33 and 34) is formed with a pair of slots 330 extending transversely of block 314 and opening into recess 320. In slots 330 and the upper portion of recess 320 is located a T-shaped end piece 332 of hardened metal. In leg 334 of piece 332 a pair of screws 336 and 338 are threadedly received. respectively to engage against ends of sections 322 and 324. These screws serve to determine the levels at which sections 322 and 324 cooperate with die block 340. A cut-out 342 is formed in plate 316 to make the ends of screws 336 and 338 accessible for adjustment.

The action of sections 322 and 324 against the work, together with such clamping action as is secured from clamp plates 326, serves to locate the punch vertically with relation to the ram. In addition, a slot 344 cut in a side face of block 314 may be brought into registry with a slot 346 in block 308 for the reception of a key 348. In this manner, blocks 308 and 314 are restrained against relative vertical movement. A pair of clamp plates 350 have flanges in engagement with clamp plates 326, and are themselves secured to block 308 by cap screws 351. Thus, block 314 is clamped securely in position; but, merely by releasing screws 351, the entire assembly of block 314 with both sections of punch 318 may be separated from ram block 308, and a new assembly substituted. Likewise, it is possible to adjust the position of sections 322 and 324 to a definite relationship to block 314, and, therefore, to their positions in relation to block 308 determined by the interlock of key 348 in slots 344 and 346, without first assembling these parts with the ram. In this manner, the time necessary for replacement of a punch for any reason is made of no consequence, and the necessity for taking the entire ram assembly apart for any such purpose is completely eliminated.

Sections 322 (Figs. 59 to 61) is cut away to form a groove 352. Then, at one end, further metal is ground away to leave a pair of guide pieces 354 extending from the section. These guide pieces are intended to interfit with a recess 356 (Figs. 26, 64 and 65) provided in die block 340 for guiding and locating the punch. Groove 352 is of the exact shape of edge 358, the cutting edge of the punch. Thus, as edge 358 wears away during the punching operation, section 322 may be ground away between guide pieces 354 to form a new edge for a substantial portion of the length of the punch. Relief for edge 358 is provided by grinding section 322 away as shown at 359.

Section 324 has a squared end 360 to fit into a recess 362 in die block 340. A recess 364 is formed in end 360, to cooperate with a pin or projection 366 in die block 340. The effective level of end 360 with relation to pin 366 is determined by the position of screw 338. End 360 does no cutting, but merely upsets metal to form head 368 and recess 370 of a zipper element 178 (Fig. 20a) in the manner to be described. Opposite ends of section 324 (Fig. 58) are formed substantially identically. Thus, when one end wears out, clamp plates 326 are released, the punch removed from recess 320, section 324 is reversed, and the other end used. Screw 338 adjusts section 324 into desired relation to section 322 for cooperation with projection 366. Section 322 must pass entirely through the thickness of the metal to shear an element from the strip; section 324 merely applies sufficient pressure to form projection 366 from the metal. Thus, different times of engagement for these two punch sections are requisite. This timing is effected by adjustment of screws 336 and 338.

In order to maintain tape 172 in proper tension as it feeds to means E under the pull of wheel 168, a tension device 372 (Fig. 7) is assembled on face 162 at a groove 374 cut in face 162. A pair of blocks 376 and 378 are secured in groove 374 by suitable means. Block 378 is of such dimensions that its top face is just below a flange 380 below recess 244. Block 378 consists of an end member 382 seated in groove 374. A plate 384 is mounted at the outside face of member 382; plate 384 and member 382 are secured together and to casting 14 by suitable securing means. Slidable in passage 386 formed between plate 384 and groove 374 is a block 388, loosely held in passage 386, but propelled by a spring 390 retained between a follower 392 and block 388. Follower 392 is carried by a screw-threaded member 398 engaged in a threaded opening 400 in member 382 for adjusting the pressure applied by block 388 against the bead of tape caught between the ends 402 of blocks 376 and 388. A finger 401 may extend from block 388 for engagement by an operator to release engagement of the block against a tape edge.

Ends 402 (Figs. 54 and 55) are substantial duplicates. Block 376 is secured in position with relation to groove 374 by suitable securing means; block 388 is slidable against the action of spring 390; the operation of ends 402 is thus the same as if the two ends were movable relatively to each other for the purpose of varying the distance between them in placing the desired tension upon the tape as it is fed to the tape feeding wheel. Both ends 402 are formed with semi-cylindrical grooves 404 for the reception of bead 174. Also a pair of flat faces are provided for engagement against the tape proper. By adjusting member 398, the frictional force against the tape will be increased or decreased and the proper tension obtained.

Block 246 has a recess 406 formed immediately below the position of punch 318 (Figs. 21, 35, 64 and 65). Die block 340 is located in recess 406, and is held in place in the recess by clamps 408 which, by suitable securing means such as screws 410, are located and held in place against the front face of block 246. In such case, clamps 408 engage against the front faces of block 340 and force it firmly into recess 406. Then block 340 rests upon a platform 414 formed in casting 14 for that purpose.

The die block is made up of substantially identical, opposite sections 416, held together tightly by any desired clamping means, as, for instance, by a through screw 418. The die block as thus constituted has a recess 420. A pair of shoulders 422 in the top faces of sections 416 immediately at the contacted faces form a groove 424 which is located to align with grooves 108, 252 and 270. A stripper plate 426 is secured on top face 428 of block 340 to close groove 424, plate 426 extending up to the edge of recess 420.

Recess 420 receives snugly assembled pieces of hardened metal and retains them tightly in their appropriate association for location in relation to punch 318. These pieces are keyed in such manner that, by tightening sections 416 by means of screw 418, the parts are rigidly and accurately located. One of these pieces is a T-shaped section 440 which is interfitted with a portion of the recess so that it is held against any movement. It has a face 442 at the same level as the bottom of groove 424. It terminates together with the shaping of other inset pieces to form recess 356 with which the guide pieces 354 cooperate. Just short of end 444 of face 442, raised projection 366 is formed. This projection cooperates with recess 364 so that, when the ram depresses them into cooperating relation, they produce upset recess 370 and head 368 in the wire.

Grooves 446 may be provided on bottom faces 448 of plates 260, and continue beneath plate 426. These grooves are directed so that air from an airline 450, which makes connection with the inlet to the passage formed by the grooves 446, will be delivered just at about the position where this upsetting operation is taking place. Air under compression for such operation may be supplied constantly to the machine throughout the operation, and will serve the purpose of cooling the upsetting punch section and projection 366 throughout the operation.

The front faces of sections 416 are formed so that, when mated, a V-shaped groove 452 is presented, and leads into a very narrow slot 454. This groove and slot, when the die block is properly assembled, are aligned to cooperate with the groove between ends 402. Held securely in recess 420 immediately at the end of slot 454, is die piece 456. A curved edge 458 formed on this piece provides cutting cooperation with edge 358. Die piece 456 likewise has a cylindrical groove 460 located immediately behind slot 454, to receive the bead of the tape during the operation of the apparatus, and to locate the bead positively with relation to wire being fed. A projection or pilot 462, having substantially the contour of projection 366, may be provided upon face 464 of piece 456. Pilot 462 serves to locate the wire end as the operation of forming and severing an element proceeds.

Face 464 is at a level above face 442. Thus, the cutting off of an element at edge 458, that is, the shearing of the metal, will have commenced and even be finished, before the formation of head 368 and recess 370 will have been commenced, effecting, among other things, reduction in the force required to be delivered by ram 272 and crosshead 274. Wire is fed up to the position of pin or projection 366. Between pin 366 and recess 364, head 368 and recess 370 are formed in the wire. Then the wire, by successive steps, is fed to a position where its first recess registers with and seats upon pilot 462. When so located, the end of the wire will have taken the form shown in Figs. 17 and 66, where a preceding section will have been severed by the action of the punch and die at edges 358 and 458. Thus it will have a pair of jaws or legs 466 which, by the action of the feeding mechanism, will be caused to straddle bead 174 of the tape. The spacing between projection 366 and pilot 462 is merely sufficient to compensate for the thickness of metal required for sections 322 and 324. It has been found that the distance for forming three heads 368 is all that is required for this purpose. Possibly stronger metal for use in cutting tools will reduce this spacing.

As shown in Figs. 17 and 18, the shaping of section 322 at cutting edge 358 and of the co-operating cutting edge 458 is such that legs 466 will have a curved portion 467 and straight edge end portions 469 substantially perpendicular to the side edges 471 which are defined by the edges of strip 12. A small angular cut 473 may connect portions 467 and 469 to prevent breaking of the punches and dies. This, in turn, will produce a round edge 475 for the head end of element 178 having straight cut faces 477, leading out to edges 471, with connecting angular corners 479.

To complete the formation of the element and its attachment to the tape, the punch descends, and edge 358 cooperates with edge 458. When edge 358 engages against the wire to shear it, the cut end of the wire must move downwardly, leaving the cut away element 178 upon the die face at pilot 462. When the punch recedes and separates from the die, the wire must move back to a proper level so that, at the next movement of feeding wheels 94 and 96, it may feed into position onto pilot 462. For that purpose, a wire return member 468 is provided to move vertically within recess 356. Member 468 is substantially of identically the same shape as the opening of recess 356, including the shaping of edge 458. Member 468 includes a column 470 having a groove 472 to fit around the portion of piece 456 whose shape produces edge 458. The column is cut away to form a pair of shoulders 474 which cooperate with walls of the recess in receiving guide pieces 354. The section of column 470 which protrudes beyond shoulders 474 includes a flat face 476 to coincide with face 464, and a bevelled face 478. The latter, when member 468 is at its uppermost position, provides a cam edge from the level of face 442 to the level of face 464.

As the punch is assembled, guide pieces 354 are engaged in recess 356 around column 470 just above shoulders 474. The wire will have been upset at a previous operation. The end, fed forward, is moved upward along face 478 until the end recess 370 coincides with pilot 462. The punch descends, cutting off an element between edges 358 and 458. However, the end of the wire is moving downwardly, and presses against face 476 to move member 468 downwardly. Then the punch recedes.

It is now necessary that member 468 return to its first position, with face 476 at the level of face 464. For this purpose, column 470 has a foot 480 at its lower end. A pin 482 having a head 484 is positioned to engage against foot 480. Pin 482 extends down through a member 486 and into a cavity 488 formed in casting 14. A spring 490 within cavity 488 bears against the enlarged head 484, and against the bottom of cavity 488, thus tending to move pin 482 and member 468 upwardly. Pin 482 is limited in its movement by the engagement of head 484 with member 486. Member 486 is screw threaded to engage the threads formed in the walls of cavity 488. In this manner, adjustment of the upward limit of movement of pin 482 and, therefore, of member 468, may be effected.

The cutting off operation may be completed before jaws 466 have been clamped upon the tape bead, or these operations may even be timed to be substantially simultaneous. It has been found desirable that the operation of clamping jaws 466 to the tape edge be completed substantially before the cutting off step proceeds. In this manner, when the legs of the element have been clamped upon the tape edge, there is no necessity for controlling that element by holding it by any part of the machine during the stages of cutting off, as the element remains firmly attached to the tape.

For this purpose, block 308 is provided with a pair of recesses 494 adjacent its side edges (Fig. 21). In each of these recesses is positioned a cam plate 498. Plate 498 has a slot 500 through which may extend suitable clamping screws 502 which engage through plate 498 into block 308. Plates 498 are thus adjustable relatively to block 308. At their lower ends, plates 498 are provided with hardened cam faces 504 (Figs. 43 and 44). At their top ends, screws 506, threaded through plate 316, bear against each of plates 498 to hold them in properly adjusted position.

A pair of openings 508 are formed in block 246 to cooperate with the side walls of recess 244. A clamp blade guide 510 is located with relation to each cam plate 498 by engagement of a lug 512 (Figs. 21, 22, 37 and 38) formed as a projection from the bottom of a clamp blade housing 514. Thus, housing 514 is restricted against movement relatively to block 246 and base 14. A lock 516 is seated upon block 246 with a pair of overhanging fingers 518 straddling housing 514. Suitable securing means fixes lock 516 to block 246 and retains housing 514 against separation from block 246.

Housing 514 has a groove 520 in which slides leg 522 of a clamp blade 524 (Figs. 39 and 40) part of which is of T-shaped cross-section. The cross-bar 526 of the blade is positioned between end faces 528 of stripper plates 260 and unrelieved wall portions 530 of housing 514 on either side of groove 520. A pin 532 extends laterally from the blade and into a slot 534. A spring 536 is seated in slot 534 between pin 532 and end face 538 of slot 534, and is retained in the passage formed between lock 516 and leg 522, to drive blade 524 to a normal position where the engaging portions 540 of the blades will be moved away from each other, the position where they would engage an element to clamp it upon the tape.

When the punch descends for the cut-off of the element, guide pieces 354 are positioned in recess 356. Edge 358 cooperates with edge 458 in effecting the cut-off. In the manner set forth, recess 364 cooperates with projection 366 to upset recess 370 and head 368 in the wire. Just before these operations are effected, however, cam ends 504 will engage cam ends 542 on clamp blades 524. This operation will serve to drive blades 524 towards each other and the extending legs 466 on the wire, driving those legs towards and clinching them around bead 174.

As shown in Figs. 30 to 32, ends 540 of clamp blades 524 have two clamping sections 546 and 548. Between them is a gap 550. As shown in Fig. 32, clamping sections 546 are positioned to engage legs 466 as they are still open around the tape bead, and preferably before the element has been separated from the wire. The shaping of sections 546 for this purpose is shown in Fig. 31.

A complex face 552 is provided for obtaining the first bend of the metal. This shaping may have to be changed in accordance with the resiliency or softness of the metal. The particular faces being considered were designed in connection with a low resiliency steel strip or wire. In connection with metal such as brass or copper, the angularities will have to be revised in accordance with the response of the metal to the clamping action. In this particular case, only the portion of section 546 indicated by face 552 will engage legs 466. Face 552 bends the metal of the legs, particularly as shown in Figs. 19 and 67. At the same time, face 556 strikes the legs and makes a slight indentation in forcing the legs firmly home against the tape. Thus the final result of the action of section 546 is to leave a corner 554 as the leg is bent from its original cut shape. As portion 556 of face 552 is at an angle of about 15° to the perpendicular to the end face of blade 524, and as it engages against the ends of legs 466, very slow closing or bending of the member will result until that slowly bending leg is hit by portion 558.

The action of the blades, as depicted in Figs. 18, 19 and 32, at this stage serves to bend the jaws into the shape shown in Figs. 19 and 67, without substantial decrease of the cross-section of the metal across portion 568. Corner 554, the corner 562 of Fig. 18, is left protruding, as the element is cut out of the continuous, parallel edged wire or strip such as used in this operation, without any scrap. Face 560 of section 548 extends beyond portion 558. Thus its action is an additional driving or closing action in finally driving the legs home, and smashing or swedging the metal of corners 554 into the body of the legs. First, however, section 322 completes the cutting off of the element, and the result is as shown in Fig. 68.

In the further operation illustrated, the wire is fed one or more, preferably two, steps after sections 546 have functioned, so that elements 178 will not be worked upon by blades 524, as assured by gap 550. Then faces 560 strike the element at corners 554. The result is a condensation of the metal in corners 554 into substantially flat faces 564; but now the density of metal in legs 466 has been increased because of the additional metal. At the same time, the legs have been stretched lengthwise across the width of the tape. Opening 566, in Fig. 20, has been reduced in its extent, and legs 466 now tightly clamp the bead of the tape, and also are tightly clamped against the body of the tape. An element made in this manner serves to produce a slide fastener which is strong so that the elements may not be pulled off the tape, and yet provides the desired shape for efficient operation of a substantially standard slider over the fastener elements. Such elements permit facility in operating the slider around curved portions of a slide fastener.

It is sometimes desirable to form gaps in stringers 10 for proper assembly of sliders and stops for separation of slide fasteners of predetermined length. For this purpose, a gap mechanism G (Figs. 62 and 63) may be associated with the apparatus. Sprocket 166, previously referred to, may form a part of such mechanism. Such sprocket may carry a chain 568. One of the links 570 of the chain may have a pin 572 extending laterally therefrom. The length of chain 568 is such that, at a definite position, determined by the rotation of shaft 156 necessary to feed a predetermined length of tape 172, pin 572 will engage against a cam plate 574. Where the machine is to be used for producing zippers of various predetermined lengths, chains 568 of various lengths may be positioned on sprocket 166. Where the machine is designed, in relation to ratchet wheel 169 and tape feed wheel 168, to feed a definite amount of tape for each revolution of shaft 156, and such length is the length of a zipper to be produced, pin 572 may be affixed directly to sprocket 166.

In any case, cam plate 574 is secured at the end of an arm 576 pivoted at 578 upon a bracket 580 secured to bracket 160. A spring 582 extends between an extension of arm 576 and bracket 580 to move cam plate 574 towards sprocket 166. A stop 584 of suitable design may be formed or secured to bracket 580 to limit arm 576 in its movement under the action of spring 582. When pin 572 engages plate 574, arm 576 is swung away from the sprocket and functions to close a switch 586.

Arm 576 carries a leaf spring 588 the position of which, by means of an adjusting screw 590, is adjustable relatively to arm 576 and a button 592 extending from switch 586. Thus, for the length of time cam plate 574 is engaged by pin 572, button 592 will be depressed to close a circuit through switch 586. The circuit, from a power source 594, includes an electromagnet 596 which may be mounted on wall 48 of casting 14. Armature 598 for the electromagnet may be retained suitably for movement towards the pole pieces of electromagnet 596. By a suitable connection 600, which may be a rod or other member pivotally or flexibly connected to armature 598 and a pin 602 carried upon an extension 604 from arm 52, the electromagnet, when energized, is made effective to rotate arm 52 about pin 50 and lift roller 58 off cam ring 49. Thus, feeding of strip 12 is interrupted. The feed of tape 172 proceeds as before. The ram continues to reciprocate; however, since no metal is being fed, no elements are formed, and none are clamped upon the tape. Gaps are thus produced at regular intervals.

Many other changes could be effected in the particular device and product designed, and in the method of operation set forth, and in specific details thereof, without substantially departing from the invention defined in the claims, the specific description being merely of operative embodiments capable of illustrating certain principles of the invention.

I claim:

1. Slide fastener stringer manufacturing apparatus including means for feeding a tape into a predetermined position, means for feeding a metallic member towards that position, and means immediately at that position for performing all operations upon the fed member to form slide fastener elements from the fed member and to attach the elements to the fed tape directly from the fed member, the feeding means including a base, a shaft carried by the base, a ram, and cooperating means carried wholly by the ram and the base and driven from the shaft for forming and cutting elements from the member and attaching the elements to the tape.

2. Slide fastener stringer manufacturing apparatus including means for feeding a tape into a predetermined position, means for feeding a metallic member towards that position, and means immediately at that position for performing all operations upon the fed member to form slide fastener elements from the fed member and to attach the elements to the fed tape, the forming means including a base, a shaft carried by the base, a ram, a pair of eccentrics of small eccentricity spaced apart on the shaft, rods extending from the eccentrics to each side of the ram, and cooperating means carried by the ram and the base and actuated entirely by the ram for forming and cutting elements from the member and attaching the elements to the tape.

3. Slide fastener stringer manufacturing apparatus, including means for feeding a tape into a predetermined position, means for feeding a metallic member towards that position, and means immediately at that position for performing all operations upon the fed member to form slide fastener elements from the fed member and to attach the elements to the fed tape, the forming means including a base, a shaft carried by the base, a pair of eccentrics of small eccentricity spaced apart on the shaft, a ram, a pair of connecting rods carried by the eccentrics, the connecting rods extending substantially vertically from the eccentrics to each side of the ram and having slight lateral movement during reciprocation by the eccentrics, and cooperating means carried wholly by the ram and the base for forming and cutting elements from the member and attaching the elements to the tape.

4. Slide fastener stringer manufacturing apparatus, including means for feeding a tape into a predetermined position, means for feeding a metallic member towards that position, and means immediately at that position for performing all operations upon the fed member to form slide fastener elements from the fed member and to attach the elements to the fed tape, the forming means including a base, a shaft carried by the base, a plurality of eccentrics of small eccentricity spaced apart on the shaft, a ram, a pair of connecting rods extending from a pair of the eccentrics to each side of the ram for reciprocating the ram, a connecting rod extending from one of the eccentrics for driving the tape feeding means, all of the connecting rods extending substantially vertically from the respective eccentrics and having slight lateral movement during reciprocation by the eccentrics, and cooperating means carried wholly by the ram and the base for forming and cutting elements from the member and attaching the elements to the tape.

5. In punch press construction, a base having a recess formed therein, a die block fitted into said recess and retained therein, a ram retained for movement towards and away from the die block, a punch block fixed to the ram, the punch block having a recess formed therein, means to form a wall at one end of the recess, the die block having a recess immediately below the recess in the punch block, a punch-retaining member clampingly retained in the recess in the punch block to position punches retained thereby towards and away from the recess in the die block, and a die-piece-retaining member clampingly locked in the recess in the die block and having means for interrelation with said punches, the punch-retaining member and the die-piece-retaining member being separable from the press without disturbing the relation of the ram and the punch block or the relation of the ram to the base or the relation of the die block and the base.

6. In punch press construction, a base having a recess formed therein, a die block fitted in said recess and fixed with relation to the base, a ram supported for movement towards and away from the die block, a punch block fixed to the ram, the punch block having a recess formed and extending substantially vertically therein and opening at the front face of the block, means to form a wall at the top end of the recess, the die block having a recess immediately below the recess in the punch block and opening at the front face of the block, a punch-retaining member clampingly retained in the recess in the punch block to position punches retained thereby towards and away from the recess in the die block, and a die-piece-retaining member clampingly locked in the recess in the die block and having means for interrelation with said punches, the punch-retaining member and the die-piece-retaining member being separable from the press without disturbing the relation of the ram and the punch block or the relation of the ram to the base or the relation of the die block and the base.

7. In punch press construction, a base having a recess formed therein, a die block fitted in said recess and fixed with relation to the base, a ram supported for movement towards and away from the die block, a punch block fixed to the ram, the punch block having a recess formed and extending substantially vertically therein and opening at the front face of the block, means to form a wall at the top end of the recess, the die block having a recess immediately below the recess in the punch block and opening at the front face of the block, a punch-retaining member, the punch-retaining member being slid into position through the open front of the recess and being then clampingly retained in the recess in the punch block to position punches retained thereby towards and away from the recess in the die block, and a die-piece-retaining member clampingly locked in the recess in the die block and having means for interrelation with said punches, the punch-retaining member and the die-piece-retaining member being separable from the press without disturbing the relation of the ram and the punch block or the relation of the ram to the base or the relation of the die block and the base.

8. In punch press construction, a base having a recess formed therein, a die block fitted in said recess and fixed with relation to the base, a ram supported for movement towards and away from the die block, a punch block fixed to the ram, the punch block having a recess formed and extending substantially vertically therein and opening at the front face of the block, means to form a wall at the top end of the recess, the die block having a recess immediately below the recess in the punch block and opening at the front face of the block, a punch-retaining member clampingly retained in the recess in the punch block to position punches retained thereby towards and away from the recess in the die block, and a die-piece-retaining member, the die-piece-retaining member being slipped into position through the open end of the recess in the die block and being then clampingly locked in the recess in the die block, the die-piece-retaining means having means for interrelation with said punches, the punch-retaining member and the die-piece-retaining member being separable from the press without disturbing the relation of the ram and the punch block or the relation of the ram to the base or the relation of the die block and the base.

9. In punch press construction, a base, a shaft carried by and extending transversely of the base, a housing supported on and extending transversely of the base above and having a plane substantially common with a plane passing through the center-line of said shaft, a ram movable in the housing and relatively to the base, eccentrics carried by the shaft, a crosshead fixed to the ram, and means connecting the eccentrics to the ends of the crosshead for reciprocating the ram with relation to the base, the plane of reciprocation of the ram being substantially the common plane of the shaft and the crosshead, and the connecting means moving substantially in the common plane.

10. In punch press construction, a base comprising a hollow housing, a shaft extending through the housing and transversely of the base, a ram housing supported on and extending substantially vertically from the base, a crosshead, a ram carried by the crosshead and movable in the ram housing relatively to the base, and means extending through the housing from the shaft to the crosshead for reciprocating the ram in the ram housing with relation to the base.

11. In punch press construction, a base comprising a hollow housing, a shaft extending through the housing and transversely of the base, a ram housing supported on and extending substantially vertically from the base, a crosshead, a ram carried by the crosshead and movable in the ram housing relatively to the base, and means extending through the housing from the shaft to the crosshead for reciprocating the ram in the ram housing with relation to the base, the ram reciprocating vertically in a path directly vertically above the shaft.

12. In punch press construction, a base comprising a hollow housing, a shaft extending through the housing and transversely of the base, a ram housing supported on and extending substantially vertically from the base, a crosshead, a ram carried by the crosshead and movable in the ram housing relatively to the base, and means extending through the housing from the shaft to the crosshead for reciprocating the ram in the ram housing with relation to the base, the ram reciprocating vertically in a path directly vertically above the shaft and the reciprocating means extending substantially vertically from the shaft to the crosshead.

13. In apparatus for forming slide fastener stringers, the apparatus including a base, a ram reciprocable towards and away from the base, means for feeding a substantially uniform metallic strip between the reciprocable ram and the base, means for feeding a tape past the end of the fed strip, the ram and the base having complementary means for forming and separating a slide fastener element from the fed strip, a pair of jaws on the base, the jaws being disposed on either side of the tape and being slidable towards each other for engaging and closing the element upon the edge of the tape, and cams carried by the ram, the cams and the jaws having cam faces brought into direct engagement on downward movement of the ram to drive the jaws into engagement with the element to close it upon the edge of the tape.

14. In apparatus for forming slide fastener stringers, the apparatus including a base, a ram movable with relation to the base, means for feeding a substantially uniform continuous metallic strip between the ram and the base, means for feeding a tape past the end of the fed strip, the ram and the base having complementary means for forming and separating a slide fastener element from the fed strip, a pair of jaws on the base, the jaws being disposed on either side of the tape and being slidable towards each other for engaging and closing the element upon the edge of the tape, and means on the ram for engaging the jaws to drive them into engagement with the element to close it upon the edge of the tape at the same time that the complementary means is forming and separating an element from the strip.

15. Apparatus for producing slide fastener stringers, including means for feeding a tape past an assembly position, means for positioning the legs of a slide fastener element astride the tape edge, a ram, the ram having means for engaging the element on movement of the ram in one direction, and clamping members actuated by the ram on movement in that direction for closing the legs of the element upon the tape edge.

16. Apparatus for producing slide fastener stringers, including means for feeding a tape past an assembly position, means for positioning the legs of a slide fastener element astride the tape edge, clamp blades movable toward and away from the tape, means on the blade for effecting a plurality of closing impacts with each leg to drive the leg into engagement with the tape edge, and means for driving the blades to impart closing impacts to the legs.

17. Apparatus for producing slide fastener stringers, including means for feeding a tape past an assembly position, means for positioning the legs of a slide fastener element astride the tape edge, clamp blades movable toward and away from the tape, means on the blade for effecting a plurality of closing impacts of different degree with each leg to drive the leg into engagement with the tape edge, and means for driving the blades to impart closing impacts to the legs.

18. Apparatus for producing slide fastener stringers, including means for feeding a tape past an assembly position, means for positioning the legs of a slide fastener element astride the tape edge, clamp blades movable toward and away from the tape, means on the blade for effecting a plurality of successive closing impacts of increasing force with each leg to drive the leg into engagement with the tape edge, and means for driving the blades to impart closing impacts to the legs.

19. Apparatus for producing slide fastener stringers, including means for feeding a tape past an assembly position, means for positioning the legs of a slide fastener element astride the tape edge, clamp blades movable toward and away from the tape, each blade having a plurality of faces for impacting a fastener leg, the faces being related so that progressively increasing impact will be delivered by a succeeding face to drive the leg into engagement with the tape edge, and means for driving the blades to impart closing impacts to the legs.

20. Apparatus for slide fastener manufacture, comprising a ram, a base, means for effecting relative movement of the ram and the base, and means removably carried by the ram and the base for forming slide fastener elements from stock fed past the ram and for attaching the elements to tape fed past the ram, the forming means, the ram and the base being formed to permit the forming means to be removed from the association by movement transversely of the direction of said relative movement.

21. Apparatus for slide fastener manufacture, comprising a ram, a base, means for effecting relative movement of the ram and the base, and means removably carried by the ram for forming slide fastener elements from stock fed past the ram, the forming means and the ram being formed to permit the forming means to be removed from the association by movement transversely of the direction of said relative movement.

22. Apparatus for slide fastener manufacture, comprising a ram, a base, means for effecting relative movement of the ram and the base, and means for forming slide fastener elements from stock fed past the ram, the ram and the forming means being constructed for assembly of the forming means with and separation of the forming means from the ram, the forming means and the ram being formed to permit the assembly and separation by movement of the forming means into and out of association with the ram transversely of the direction of said relative movement.

23. Apparatus for slide fastener maufacture, comprising a ram, a base, means for effecting relative movement of the ram and the base, the ram having a recess opening transversely of the direction of said relative movement, and means removably positioned in the recess for forming slide fastener elements from stock fed past the ram, the forming means and the recess being formed to permit the assembly and separation of the forming means and the recess by movement of the forming means into and out of the recess transversely of the direction of said relative movement.

24. Apparatus for slide fastener manufacture, comprising a ram, a base, means for effecting relative movement of the ram and the base, the ram having a recess opening from a side wall thereof, and means removably positioned in the recess for forming slide fastener elements from stock fed past the ram, the forming means and the recess being formed to permit the assembly and separation of the forming means and the recess by movement of the forming means into and out of the recess transversely of the direction of said relative movement.

25. Apparatus for slide fastener manufacture, comprising a ram, a base, means for effecting relative movement of the ram and the base, the ram having a recess opening from a side wall thereof, a block seated in the recess and removably held against movement forwardly out of the recess, the block having a recess opening in the same direction as the ram recess, and means removably held in the block recess, said means comprising means for forming slide fastener elements from stock fed past the ram, the block and the ram recess being formed to permit the block and the forming means to be assembled as a unit with or with or to be separated as a unit from the ram recess transversely of the direction of said relative movement.

26. Apparatus for slide fastener manufacture, comprising a ram, a base, means for effecting relative movement of the ram and the base, the ram having a recess opening from a side wall thereof, a block seated in the recess and removably held against movement forwardly out of the recess, the block having a recess opening in the same direction as the ram recess, and a plurality of metal working members snugly seated in abutting relation in the block recess, the members being slidable with relation to each other and the block, the members comprising means for forming slide fastener elements from stock fed past the ram, the block and the ram recess being formed to permit the block and the members to be assembled as a unit with or to be separated as a unit from the ram recess transversely of the direction of said relative movement.

27. Apparatus for slide fastener manufacture, comprising a ram, a base, means for effecting relative movement of the ram and the base, the ram having a recess opening from a side wall thereof, a block seated in the recess and removably held against movement forwardly out of the recess, the block having a recess opening in the same direction as the ram recess, and a plurality of metal working members snugly seated in abutting relation in the block recess, the members being slidable with relation to each other and the block, means carried by the block adjustably to fix the positions of the members with relation to the block, the members comprising means for forming slide fastener elements from stock fed past the ram, the block and the ram recess being formed to permit the block and the members to be assembled as a unit with or to be separated as a unit from the ram recess transversely of the direction of said relative movement.

28. Apparatus for slide fastener manufacture, comprising a ram, a base, means for effecting relative movement of the ram and the base, the ram having a recess opening from a side wall thereof, a block seated in the recess and removably held against movement forwardly out of the recess, the block having a recess opening in the same direction as the ram recess, and a plurality of metal working members snugly seated in abutting relation in the block recess, the members being slidable with relation to each other and the block, means carried by the block adjustably to fix the positions of the members with relation to the block and to each other, the members comprising means for forming slide fastener elements from stock fed past the ram, the block and the ram recess being formed to permit the block and the members to be assembled as a unit with or to be separated as a unit from the ram recess transversely of the direction of said relative movement.

29. In punch press construction, a base, a shaft, ways positioned on the base, a crosshead, eccentrics carried by the shaft, a ram carried by the crosshead and slidable in the ways, the crosshead being positioned free of and extending beyond the ways, and means connecting the eccentrics to the crosshead extensions for reciprocating the ram with relation to the base, the crosshead and the ram reciprocating in a plane substantially including the shaft, the connecting means moving substantially in said common plane.

30. In punch press construction, a base, a shaft, eccentrics carried by the shaft, ways positioned on the base, a crosshead disposed substantially vertically above the shaft, a ram carried by the crosshead and slidable in the ways, the crosshead being positioned free of and extending beyond the ways, and means connecting the eccentrics to the crosshead extensions for reciprocating the ram with relation to the base, the crosshead and the ram reciprocating in a plane substantially including the shaft, the connecting means moving substantially in said common plane.

31. In punch press construction, a base, a shaft, a ram movable relatively to the base, means actuated by the shaft for reciprocating the ram with relation to the base, a punch block carried by the ram, the block having a recess formed therein and extending substantially the entire extent of the block in the direction of movement of the ram, a punch holder seated snugly in the recess, the punch holder having a recess extending substantially the entire extent of the holder in the same direction as the recess in the block, and a punch nested in the punch holder recess.

32. In apparatus for forming slide fastener stringers, the apparatus including a base, a ram movable with relation to the base, means for feeding a substantially uniform metallic strip to the ram, means for feeding a tape in a fixed path in the path of movement of the fed strip, means comprising means slidable on the base and engageable by means on the ram for closing elements on the edge of the tape, and means carried by the ram for forming an element in the strip and for separating an element from the strip, the closing means and the forming and separating means being made effective during the same stroke of the ram in one direction.

33. In apparatus for forming slide fastener stringers, the apparatus including a base, a ram movable with relation to the base, means for feeding a substantially uniform metallic strip to the ram, means for feeding a tape adjacent the ram, means comprising means engageable by means on the ram for closing elements on the edge of the tape, and means for forming an element in the strip and for separating an element from the strip on movement of the ram in one direction, the closing means being energized by the ram during movement of the ram in said direction.

34. In apparatus for forming slide fastener stringers, the apparatus including a base, a ram movable with relation to the base, means for feeding a substantially uniform metallic strip to the ram, means for feeding a tape adjacent the ram and in the path of movement of the fed strip, means comprising means engageable by means on the ram for closing elements on the edge of the tape, and means for forming an element in the strip and for separating an element from the strip on movement of the ram in one direction, the closing means being energized by the ram during movement of the ram in said direction.

35. In apparatus for forming slide fastener stringers, the apparatus including a base, a ram movable with relation to the base, means for feeding a substantially uniform metallic strip to the ram, means for feeding a tape in the path of movement of the fed strip, means comprising means slidable on the base and engageable by means on the ram for closing elements on the edge of the tape, and means for forming an element in the strip and for separating an element from the strip on movement of the ram in one direction, the closing means being energized by the ram during movement of the ram in said direction.

36. In apparatus for forming slide fastener stringers, the apparatus including a base, a ram movable with relation to the base, means for feeding a substantially uniform metallic strip to the ram, means for feeding a tape in the path of movement of the fed strip, means comprising means slidable on the base and engageable by means on the ram for closing elements on the edge of the tape, and means carried by the ram for forming an element in the strip and for separating an element from the strip on movement of the ram in one direction, the closing means being energized by the ram during movement of the ram in said direction.

37. Slide fastener stringer manufacturing apparatus, including means for feeding a tape in a fixed path past a predetermined position, means for feeding a metallic member toward that position, and means immediately at that position for performing all operations upon the fed member to form slide fastener elements from the fed member and to attach the elements to the fed tape directly from the fed member, the forming means including a base, a ram, means for reciprocating the ram, and cooperating means carried by the ram and the base and actuated entirely by the ram for forming portions of elements in the member including legs at the end of the member, the feeding means moving the member to place the legs astride the fed tape, and the cooperating means comprising means for cutting an element from the member and for attaching the element to the tape as the legs of the element integrally formed in the member are extended astride the fed tape.

38. Slide fastener stringer manufacturing apparatus, including means for feeding a tape into a predetermined position, means for feeding a metallic member toward that position, and means immediately at that position for performing all operations upon the fed member to form slide fastener elements from the fed member and to attach the elements to the fed tape, the forming means including a base, a shaft, a ram, eccentrics of small eccentricity on the shaft, rods extending from the eccentrics to the ram, and cooperating means carried by the ram and the base and actuated entirely by the ram for forming portions including legs of elements in the member, the feeding means moving the member to place the legs astride the fed tape, and the cooperating means comprising means for cutting an element from the member and for attaching the element to the tape as the legs of the element are extended astride the fed tape.

39. In apparatus for forming slide fastener stringers, the apparatus including a base, a ram movable with relation to the base, means for feeding a substantially uniform metallic strip between the ram and the base, means for feeding a tape in a fixed path past the end of the fed strip, the ram and the base having complementary means for forming and separating a slide fastener element from the fed strip, means slidable on the base immediately at the position of the separating means and disposed on either side of the tape for closing the element upon the edge of the tape as it is separated from the strip, and means on the ram for directly engaging the slidable means to drive them into engagement with the element to close it upon the edge of the tape.

40. In apparatus for forming slide fastener stringers, the apparatus including a base, a ram movable with relation to the base, means for feeding a substantially uniform metallic strip between the ram and the base, means for feeding a tape in a fixed path past the end of the fed strip, the ram and the base having complementary means for forming and separating a slide fastener element from the fed strip, a pair of jaws on the base immediately at the position of the separating means, the jaws being disposed on either side of the tape and being slidable toward each other for engaging and closing the element upon the edge of the tape as it is separated from the strip, and means on the ram for engaging the jaws to drive them into engagement with the element to close it upon the edge of the tape, the jaws and the jaw engaging means having cam faces for direct engagement.

DAVID SILBERMAN.

REFERENCES CITED

The following references are of record in the file of this patent:

UNITED STATES PATENTS

| Number | Name | Date |
|---|---|---|
| 703,747 | Stimpson | July 1, 1902 |
| 1,198,512 | Axcell | Sept. 19, 1916 |
| 1,322,525 | Bowers | Nov. 25, 1919 |
| 1,379,420 | Sawyer | May 24, 1921 |
| 1,560,328 | Schulest | Nov. 3, 1925 |
| 1,629,268 | Greenburg | May 17, 1927 |
| 1,947,956 | Sundback | Feb. 20, 1934 |
| 1,958,537 | Glass | May 15, 1934 |
| 2,078,017 | Poux | Apr. 20, 1937 |
| 2,097,099 | Legat | Oct. 26, 1937 |
| 2,116,712 | Prentice | May 10, 1938 |
| 2,116,726 | Legat | May 10, 1938 |
| 2,148,673 | Arentzen | Feb. 28, 1939 |
| 2,185,769 | Kiessling | Jan. 2, 1940 |
| 2,201,068 | Wintritz | May 14, 1940 |
| 2,251,153 | Munschauer | July 29, 1941 |
| 2,255,377 | Carlson | Sept. 9, 1941 |
| 2,259,320 | Novick et al. | Oct. 14, 1941 |
| 2,267,783 | Behrens | Dec. 30, 1941 |
| 2,275,454 | Miller | Mar. 10, 1942 |
| 2,284,569 | Glassner | May 26, 1942 |
| 2,294,253 | Taberlet | Aug. 25, 1942 |
| 2,299,606 | Wintritz | Oct. 20, 1942 |
| 2,302,075 | Ulrich | Nov. 17, 1942 |
| 2,310,660 | Ulrich | Feb. 9, 1943 |
| 2,336,662 | Glasner | Dec. 14, 1943 |
| 2,346,925 | Lewis | Apr. 18, 1944 |
| 2,361,687 | Hermani | Oct. 31, 1944 |
| 2,370,380 | Ulrich | Feb. 27, 1945 |
| 2,387,027 | Jackson | Oct. 16, 1945 |

FOREIGN PATENTS

| Number | Country | Date |
|---|---|---|
| 521,328 | Great Britain | May 17, 1940 |

Certificate of Correction

Patent No. 2,437,793.  March 16, 1948.

DAVID SILBERMAN

It is hereby certified that errors appear in the printed specification of the above numbered patent requiring correction as follows: Column 17, line 64, claim 1, and column 18, line 4, claim 2, after the syllable "ratus" insert a comma; column 22, line 67, claim 25, strike out the words "with or"; column 25, line 20, claim 37, for "partions" read *portions*; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*